May 7, 1968  D. J. MAYHEW  3,381,971
PISTON RING EXPANDER AND SPACER
Filed Oct. 23, 1965
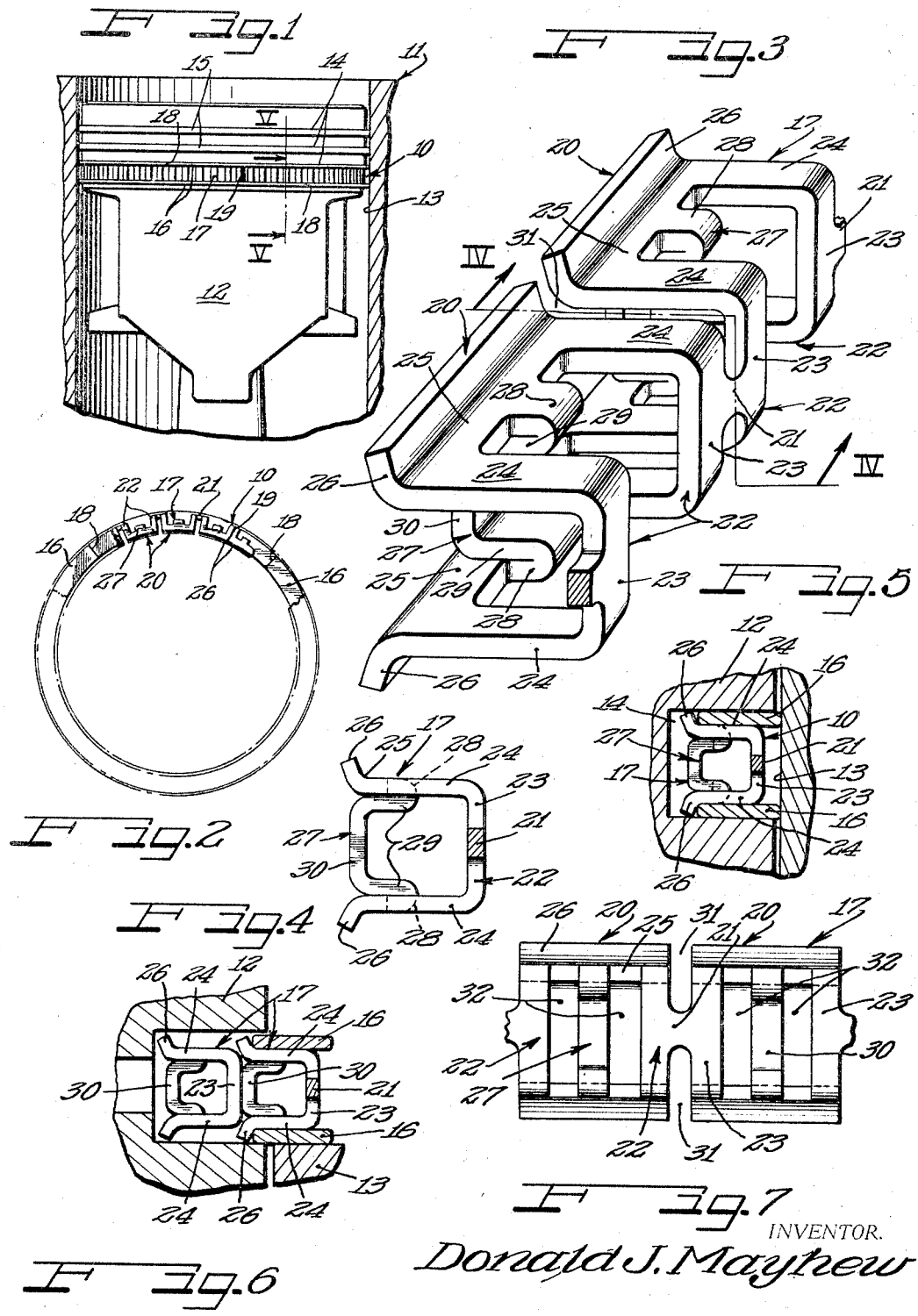
INVENTOR.
Donald J. Mayhew
BY Hill, Sherman, Meroni, Gross & Simpson  ATTORNEYS 3,381,971
PISTON RING EXPANDER AND SPACER
Donald J. Mayhew, Manchester, Mo., assignor to Ramsey
Corporation, St. Louis, Mo., a corporation of Ohio
Filed Oct. 23, 1965, Ser. No. 503,897
5 Claims. (Cl. 277—140)

ABSTRACT OF THE DISCLOSURE

A spacer-expander ring for thin rail rings of the inwardly opening channel type. The expander is composed of circumferentially spaced inwardly directed U-shape segments having outer peripheral upstanding legs at their ends connected at their outer peripheries into an integral ring, each segment having an upstanding leg at the inner periphery thereof supporting the inwardly opening U against collapse and each segment having axially outwardly directed lips at the inner periphery thereof to engage the inner peripheries of the rail rings.

This invention relates to a circumferential expander-spacer ring for piston ring assemblies which will provide ample support and desired expanding forces without accommodating overlap during installation. Specifically, this invention relates to an oil ring expander-spacer for piston ring assemblies which is especially suited for automated installation in engines and will provide any desired radial expansion force without shifting of supporting surfaces.

Prior known expanders-spacers for piston ring assemblies have been of a radially corrugated or U-shaped channel ring type with angled tabs for engaging the inner peripheries of rail rings supported thereby to exert expansion loads thereon. These rings are not suited for automated installation in engines because they are either prone to overlap at their split ends, receive the rail rings in the channels thereof, or allow the rail rings to ride over the angled tabs.

The expanders-spacers of this invention avoid the deficiencies of the prior known rings and are especially well adapted for automated installation in engines. The rings of this invention cannot overlap in a piston ring groove and still be accepted by the engine cylinder. These rings cannot accept rail rings in their channel and are reinforced against collapse so that the rail rings cannot ride over the angled tabs. At the same time, the expanders-spacers of this invention are sufficiently "open" to accommodate free oil drainage while providing ample support for the rail rings. The expanders-spacers of this invention are sufficiently flexible as to conform with any irregularities and tolerance variations. The rings have a plurality of deflecting spring members in each segment thereof, but these members do not change width upon deflection.

It is then an object of this invention to provide a conformable circumferential expander-spacer for piston ring assemblies which is especially suited for automated installation since it cannot overlap, receive rail rings in a channel thereof, or accommodate positioning of the rail rings therebehind.

Another object of this invention is to provide a spacer-expander for rail ring assemblies in pistons which is so supported across both its inner and outer peripheries as to prevent collapse of the rail ring supporting elements thereof.

A further object of the invention is to provide an oil control ring expander for piston ring assemblies composed of a ring of circumferentially spaced U-shaped segments connected at their outer periphery and having collapsed resisting support legs at their inner periphery.

A specific object of the invention is to provide a conformable circumferential expander-spacer ring made from strip material divided into sections by transverse slots with each section divided into three or more straps and with the first and last strap of each section constituting a U-shape with the legs of the U extending radially inward and with the remaining straps constituting a W-shape providing a collapse resisting leg at the inner periphery of the segment.

Other and further objects of the invention will be apparent to those skilled in this art from the following detailed description of the annexed sheet of drawings which, by way of a preferred example only, illustrates one embodiment of the invention.

On the drawings:

FIGURE 1 is a fragmentary sectional view, with parts in elevation, of a cylinder and piston assembly, including an oil ring assembly according to this invention;

FIGURE 2 is a plan view of the oil control ring assembly of FIGURE 1, with parts broken away to show the expander-spacer ring;

FIGURE 3 is an enlarged fragmentary isometric view of the expander-spacer ring of this invention;

FIGURE 4 is a transverse sectional view taken through the plane IV—IV of FIGURE 3;

FIGURE 5 is an enlarged transverse sectional view taken generally along the line V—V of FIGURE 1;

FIGURE 6 is a view similar to FIGURE 5, but illustrating the manner in which an overlapping of the assembly of this invention will prevent installation in the cylinder; and FIGURE 7 is a fragmentary outer face view of the expander-spacer of this invention.

As shown on the drawings:

The oil ring assembly 10 of this invention is illustrated in FIGURE 1 in operating position in a piston and cylinder installation 11, including a conventional internal combustion engine piston 12 slidably mounted in a conventional engine cylinder 13. The piston 12 has a head with a plurality of ring grooves 14 therearound, including two top grooves containing conventional metal piston rings 15 and a bottom groove containing the oil ring assembly 10 of this invention. The assembly 10 is composed of a pair of thin metal rail rings of segments 16 supported on the expander-spacer 17 of this invention. The rail rings 16 are split, as shown at 18 in FIGURE 2, and are supported by the ring 17 against the top and bottom sides of the ring groove 14 while at the same time being urged radially outward against the cylinder 13, as shown in FIGURE 5.

The expander-spacer ring 17 is split at 19 with the split ends abutted together in the ring groove 14. The ring 17 is composed of a ring of circumferentially spaced inwardly opening U-shaped segments 20, each joined together at their outer periphery by a narrow connecting portion 21 midway between the tops and bottoms thereof. Each U-shaped section 20 has a U-shaped strap 22 at the ends thereof and each U-shaped strap 22 has an upstanding leg 23 at the outer periphery of the ring, together with the inwardly directed top and bottom legs 24 extending radially inward to circumferential lands 25 with outturned sloping lips or flanges 26 at the radial inner ends thereof. Each segment 20 has a W-shaped strap 27 between the end straps 22, and each strap 27 has an outwardly directed leg 28 extending radially outward from the midpoint of the lands 25 and then folded back on itself to provide a radially inward directed leg 29 overlying the inner faces of the lands 25. An upstanding leg 30 joins the inner ends of the legs 29 substantially flush with the inner periphery of the ring 17.

The U-shaped segments 20 are thus closed at their outer periphery by the legs 23 which will prevent entry of a rail ring in the channel of the ring 17. In addition, the segments 20 are closed at their inner peripheries by the legs 30 which will prevent nesting together or overlapping of the end portions of the ring, as shown in FIGURE 6. As there shown, the inner leg 30 will abut an outer leg 23 to hold one end of the ring 17 radially outward from the other end and thereby prevent the assembly from entering the cylinder 13. This safety feature is especially important in automatic installation of ring assemblies in engines.

As shown in FIGURES 5 and 6, the legs 24 provide ample support for the rails 16 and in turn are held apart against collapse by the outer legs 23 and the inner legs 30. The angled flanges 26, acting on the inner peripheries of the rails 16 to urge them radially and axially outward against the cylinder 13 and against the side walls of the groove 14, cannot be deflected sufficiently inward to accommodate passage of the rails 16 thereover, because the inner legs 30 will prevent inward collapse of the inner ends of the legs 24. Likewise, the radial outer ends of the legs 24 cannot collapse to accommodate a "paint-brush" movement of the rail rings 16 since the legs 23 will prevent such inward collapse.

As viewed in FIGURE 7, the expander-spacer 17 may be described as a strip of metal with opposed transverse slots 31 extending inwardly from the side edges thereof to the narrow connecting portion 21 between the adjacent segments 20. Each segment 20 is composed of end straps 22 and a central strap 27 separated by transverse slots 32 and joined by the lands 25 having the outturned lips 26. Each segment 20 is U-shaped in cross-section and has the end straps 22 thereof bent to form upstanding legs at the outer periphery of the ring and inwardly extending legs 24 providing supports for the rail rings. The strap 27 is W-shaped with its upstanding leg 30 reinforcing the legs 24 against inward collapse. The legs 24 and lands 25 provide deflecting spring members, but they will not change in width upon deflection since the connecting portions 21 accommodate radial contractions and expansions.

From the above description, it will, therefore, be understood that the invention provides a conformable circumferential expander-spacer for piston ring assemblies made from strip metal by dividing the strip into sections with transverse slots and by dividing the sections into straps with intermediate transverse slots and by then bending the slotted strip into U-shaped configuration of the inwardly opening type and with an intermediate strap being bent into W-shaped configuration to support the inner ends of the channel against collapse. It will be understood, of course, that more than one intermediate W-shaped strap could be provided in each section and that other configuration changes could be made without departing from the principles of this invention.

Although minor modifications might be suggested by those versed in the art, it should be understood that I wish to embody within the scope of the patent granted hereon, all such modifications as reasonably and properly come within the scope of my contribution to the art.

I claim as my invention:

1. An oil control piston ring assembly which comprises a pair of split thin rail rings, a conformable circumferential expander-spacer ring between said rail rings in supporting and expanding relationship therewith, said expander-spacer ring having circumferentially spaced inwardly opening U-shaped segments connected at their outer peripheries providing axially spaced top and bottom rail ring supporting legs, each of said segments having axial legs supporting said top and bottom legs against axial collapse, said axial legs integral with said segments and having radial portions underlying said top and bottom legs and axial portions adjacent the inner peripheries of said top and bottom legs connecting said radial portions, and said segments having outturned lips engaging the inner peripheries of the rail rings for expanding the rail rings.

2. A spacer-expander ring for a piston ring assembly which comprises a ring of circumferentially spaced radially inwardly opening U-shaped segments joined together at the outer periphery of the ring, each segment having U-shaped straps at the ends thereof with axially extending legs at the outer periphery and radially inwardly directed top and bottom legs, said axially extending legs of adjacent segments being connected midway between the ends thereof, the inner ends of the top and bottom legs of the end straps of each segment being connected by circumferentially extending lands having outturned angled lips, each segment having a W-shaped upstanding angled strap between the end straps with top and bottom legs attached to and extending radially outward from the lands and then folded back over the opposed inner faces of the lands in engagement therewith, and an upstanding leg at the inner periphery of the segments connecting the radial inner ends of the folded back legs.

3. An expander-spacer ring for piston oil ring assemblies which will not overlap during assembly, collapse during use, or accommodate improper positioning of rail rings which comprises a metal strip divided into sections by opposed transverse slots originating near the center and extending though the opposite edges of the strip, each of said sections having at least three straps separated by transverse slots terminating short of the edges of the strip and joined at said edges by land portions, each section being U-shaped in cross-section having the end straps adjacent the opposed slots forming upstanding legs at the outer periphery of the ring and inwardly extending legs at the axial outer ends of the upstanding legs providing support surfaces, upstanding angled ends on the radial inner ends of the lands, and a strap between the end straps being W-shaped in cross-section with an upstanding leg bottomed on the lands for reinforcing the U-shaped segment against inward collapse.

4. A spacer-expander ring for a piston ring assembly which comprises: upper and lower rings having a plurality of circumferentially spaced radially outwardly opening substantially U-shaped segments, axially outwardly directed lips formed along the radially innermost edges of the bight portions of the said U-shaped segments, the segments of said upper and lower rings connected by a plurality of circumferentially spaced axial straps, each of said straps integral with one leg of a segment in each ring at the radially outer diameter of said segment legs, said segments circumferentially connected by integral portions connecting adjacent straps, and axial legs integrally connecting the segments of the upper and lower rings from the radially outermost edge of the bight portion of each segment to prevent axial collapse of the upper and lower rings.

5. The ring of claim 4 wherein the axial legs have portions extending radially inward from the radially outermost edge of the bight portions of each segment, said radial portions bottomed on the bight portion and axial portions integral with the radial portions and connecting the radial portions.

References Cited

UNITED STATES PATENTS

| | | | |
|---|---|---|---|
| 3,055,669 | 9/1962 | Knoebel | 277—139 |
| 3,136,559 | 6/1964 | Hamm | 277—139 |
| 3,138,391 | 6/1964 | Charlesworth | 277—140 |
| 3,195,905 | 7/1965 | Brenneke | 277—140 |
| 3,323,807 | 6/1967 | Vanderbilt | 277—140 |

LAVERNE D. GEIGER, *Primary Examiner.*

J. S. MEDNICK, *Assistant Examiner.*